United States Patent
Demole

(10) Patent No.: US 6,682,054 B2
(45) Date of Patent: Jan. 27, 2004

(54) ACCELERATION SYSTEM

(76) Inventor: Frederic Jean-Pierre Demole, 2 Old Brompton Road, London (GB), SW7 3DQ ( * ) Notice: Subject to any disclaimer, the term of this patent is extended or adjusted under 35 U.S.C. 154(b) by 0 days.

(21) Appl. No.: 10/204,702

(22) PCT Filed: Feb. 23, 2001

(86) PCT No.: PCT/GB01/00760
§ 371 (c)(1),
(2), (4) Date: Sep. 20, 2002

(87) PCT Pub. No.: WO01/62594
PCT Pub. Date: Aug. 30, 2001

(65) Prior Publication Data
US 2003/0110857 A1 Jun. 19, 2003

(30) Foreign Application Priority Data
Feb. 24, 2000 (GB) .............. 0004215

(51) Int. Cl.$^7$ ............... B66D 1/36
(52) U.S. Cl. ............... 254/283
(58) Field of Search ............... 254/283

(56) References Cited

U.S. PATENT DOCUMENTS

| | | |
|---|---|---|
| 1,734,353 A | 11/1929 | Sperry |
| 2,379,267 A | 6/1945 | Wilson |
| 3,446,461 A | 5/1969 | Riblett, Jr. |
| 3,599,905 A * | 8/1971 | Strance .............. 244/63 |
| 4,094,143 A * | 6/1978 | Schlegel et al. ........ 60/352 |
| 4,353,448 A * | 10/1982 | Sommer ............ 192/70.13 |
| 4,678,143 A | 7/1987 | Griffin |
| 5,524,733 A | 6/1996 | Chun |

FOREIGN PATENT DOCUMENTS

| | | |
|---|---|---|
| DE | 515 648 | 12/1930 |
| DE | 25 58 901 | 7/1977 |
| EP | 482970 * | 9/1991 |
| GB | 220 292 | 10/1925 |
| GB | 1145137 | 3/1969 |

* cited by examiner

*Primary Examiner*—Emmanuel M. Marcelo
(74) *Attorney, Agent, or Firm*—Nixon & Vanderhye P.C.

(57) ABSTRACT

An acceleration system (30) for accelerating a load, for example for launching an aircraft (21), comprises a flywheel (12) driven from a power source (15), the flywheel (22) having a spiral profiled surface (16) for receiving a cable (17) a remote end portion of which is connectable to the aircraft (21). The profiled surface (16) ensures that launching of the aircraft (21) is effected smoothly, initially at low speed and then at progressively increasing speed until the aircraft attains take-off speed.

4 Claims, 3 Drawing Sheets

ACCELERATION SYSTEM

Figure 1:
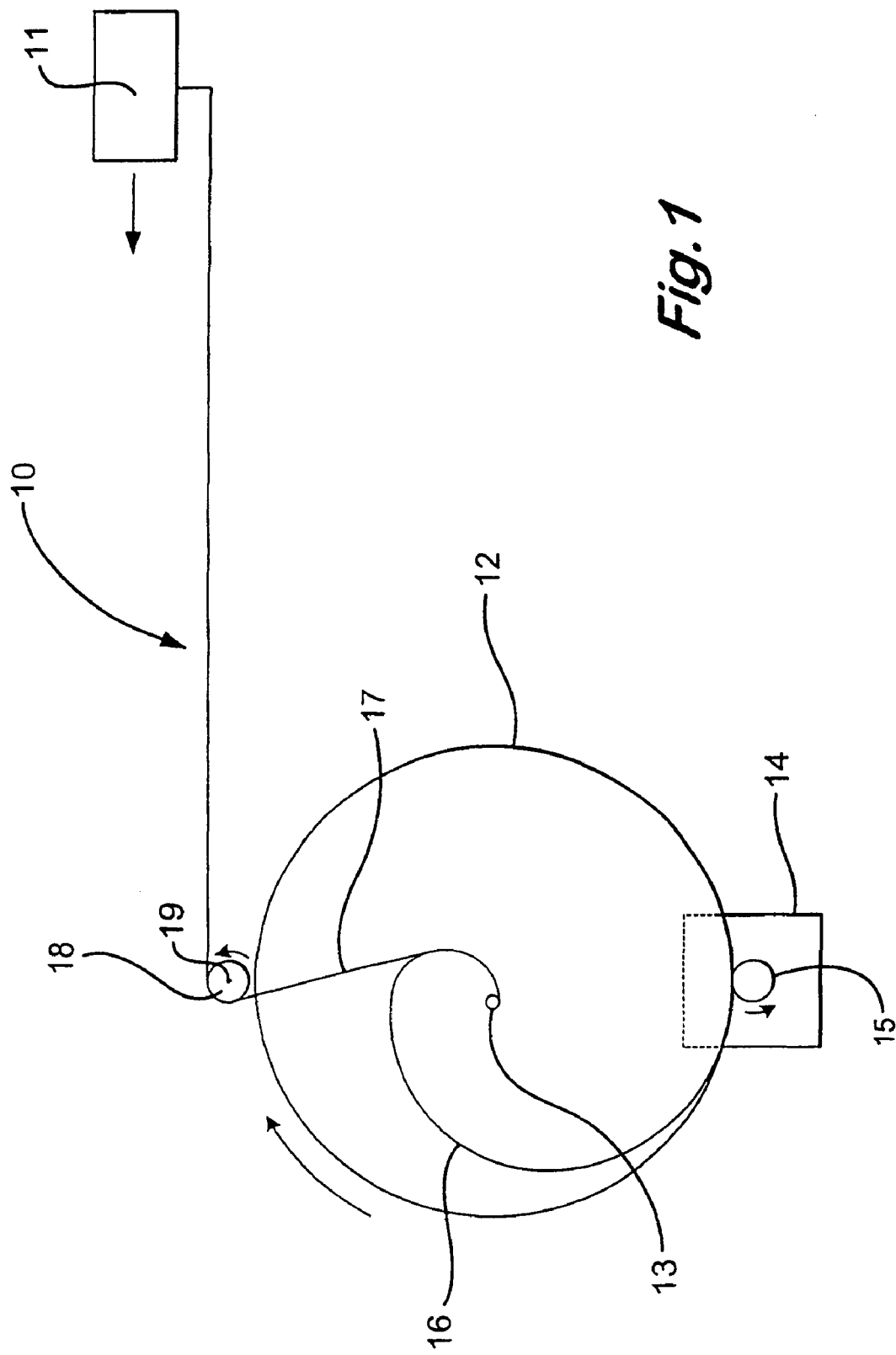

This application is the U.S. national phase of international application PCT/GB01/00760 filed Feb. 23, 2001 which designated the U.S.

This invention relates to an acceleration system for accelerating a load, and particularly, but not exclusively, to an aircraft launching system.

In GB 1 145 137 A, there is described an aircraft launching system comprising a cable, an end portion of which is adapted for releasably coupling with an aircraft and a remote end portion of which is secured. The cable is entrained in a pulley system, which includes a mechanism for accelerating the cable in a longitudinal direction so as to launch an aircraft coupled to the cable. The mechanism comprises a flywheel and a two-speed transmission coupled to the flywheel by a multiple disc friction clutch. The arrangement is such that the aircraft is accelerated slowly at first, for a distance approximately a quarter of the launch distance, and then accelerates rapidly to reach take-off speed.

In U.S. Pat. No. 1,734,353 A, there is described an aircraft launching system comprising a cable, an end portion of which is adapted for releasably coupling with an aircraft and a remote end portion of which is secured. The cable is entrained in a pulley system, which includes a mechanism for accelerating the cable in a longitudinal direction so as to launch an aircraft coupled to the cable. The mechanism comprises a flywheel and a gear coupling a motor to the flywheel, a drum, adapted for rotation on an axis, the surface of which has a curved profile the radial dimension of which increases progressively from the said axis in an arcuate direction of the said axis, and a clutch to couple the drum to the rotating flywheel. The arrangement is such as to impart a uniform acceleration to the aircraft and have it reach take-off speed.

An objective of the present invention is to provide an acceleration system, which provides energy uniformly over a short time span.

According to the present invention there is provided an acceleration system comprising a cable, an end portion of which is adapted for releasably coupling with a load, a rotary member adapted for rotation on an axis and drive means for disengageably engaging with the rotary member so as to rotate the rotary member on the axis characterised in that the rotary member is provided with a surface for receiving a portion of the cable remote from the said end portion and the surface has a curved profile the radial dimension of which increases progressively from the said axis in an arcuate direction of the said axis.

Following is a description, by way of example only and with reference to the accompanying drawings, of one method of carrying the invention into effect.

Figure 2:
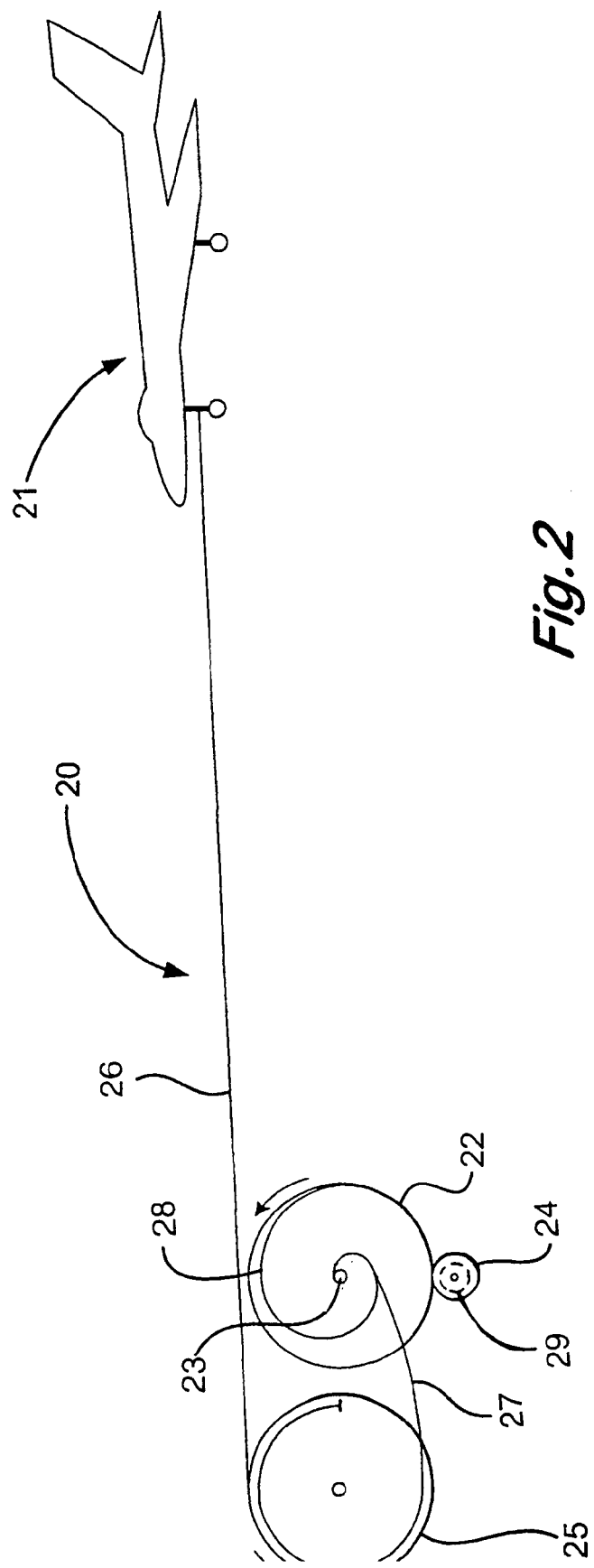
Figure 3:
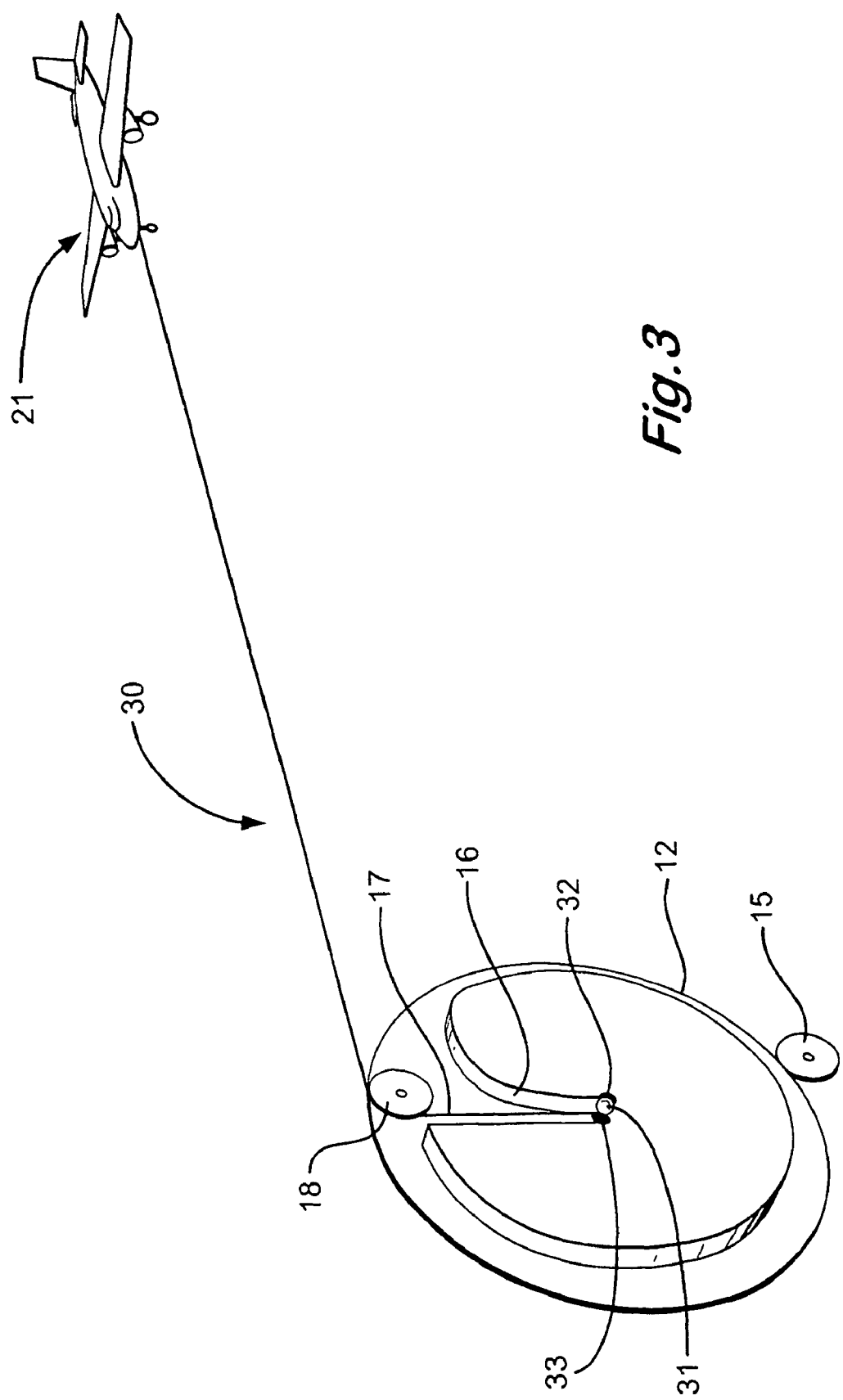

In the drawings:

FIG. 1 is a diagrammatic representation demonstrating the principle of operation of an acceleration system in accordance with the present invention, FIG. 2 is a diagrammatic representation of an embodiment of an acceleration system in accordance with the present invention, FIG. 3 is a diagrammatic representation of another embodiment of an acceleration system in accordance with the present invention.

Referring now to FIG. 1 of the drawings there is shown an embodiment of a system 10 for accelerating a load 11 in accordance with the present invention comprises a wheel 12 rotatably mounted on an axis 13 and driven, so as to rotate on the axis 13, by means of a power source 14 acting through a drive roller 15 in contact with a peripheral surface of the wheel 12. The wheel 12 is provided with a surface 16 for receiving a cable 17. The surface 16, when viewed axially of the axis 13, is of a curved formation, the profile of which extending longitudinally of the surface 16 and in a radial direction from the axis 13 increases progressively from the axis 13 in an arcuate direction of the axis 13. The cable 17 is guided around a pulley 18 which is freely rotatably mounted on an axis 19 located above the wheel 12 and an end portion of the cable 17 is adapted to be locatable on the axis 13. Means (not shown) is provided for pushing the cable 17 towards the wheel 12 in an axial direction of the wheel 12.

In a starting position, an end portion of the cable 17 remote from the axis 13 is connected to the load 11 while the distal end of the cable 17 is held away from the profiled surface 16 of the wheel 12. The power source 14 is then operated so as to rotate the wheel 12. When the rotational kinetic energy is sufficient to provide power to accelerate the load 11, then the said means is operated to push the distal end of the cable 17 towards the wheel 12 so that the distal end of the cable 17 locates on the profiled surface 16, the end portion of the cable 17 remote from the load 11 being restrained at the centre of the wheel 12.

The effect of the profile of the surface 16 is such that the cable 17 draws the load 11 in a direction towards the pulley 18, initially at low speed and then at progressively increasing speed as the radial distance of the profile of the surface 16 from the axis 13 increases.

Means would be provided for disengaging the drive roller 15 from the wheel 12 and for braking the wheel 12 after the load 11 has been launched.

Referring now to FIG. 2 of the drawing there is shown an embodiment of a system 20, in accordance with the present invention, for launching an aircraft 21. The system comprises a wheel 22 rotatably mounted on an axis 23 and driven, so as to rotate on the axis 23, by means of a power source 24 acting through a clutch 29. The wheel 22 is provided with a surface 28 for receiving a cable 27. The surface 28, when viewed axially of the axis 23, is of a curved formation, the profile of which extending longitudinally of the surface 28 and in a radial direction from the axis 23 increases progressively from the axis 23 in an arcuate direction of the axis 23. The other end portion of cable 27 is turned on an additional rotary member 25, which is adapted for rotation on a second axis. A second cable 26 is attached on one of its end portion to the additional rotary member and is connected on its other end portion to the aircraft 21. Means (not shown) is provided for pushing the cable 27 towards the wheel 22 in an axial direction of the wheel 22.

In a starting position, an end portion of the cable 27 remote from the axis 23 is connected to the aircraft 21 while the distal end of the cable 27 is held away from the profiled surface 28 of the wheel 22. The power source 24 is then operated so as to rotate the wheel 22. When the rotational kinetic energy is sufficient to provide power to accelerate the aircraft 21, then the said means is operated to push the distal end of the cable 27 towards the wheel 22 so that the distal end of the cable 27 locates on the profiled surface 28, the end portion of the cable 27 remote from the aircraft 21 being restrained at the centre of the wheel 22.

The arrangement is such that the drum 25 is of lighter construction than the wheel 22 and may be arranged such as to accommodate the length of the cable 26 more easily than the profiled surface 28.

Referring now to FIG. 3 of the drawing there is shown an embodiment of a system 30 which operates in accordance with the principle described with reference to FIG. 1 except that, instead of being locatable on the axis 13, an end of the cable 17 is provided with a ball 31 and the wheel 12 is provided with a pair of spaced protrusions 32, 33 located adjacent a centre of the wheel 12.

The arrangement is such that, in a starting position, the wheel 12 rotates on the axis 13 and the portion of the cable 17 extending from the pulley 18 to the ball 31 is located a short distance away from the wheel 12. Means (not shown) is then operated to push that same portion of the cable 17 towards the wheel 12 so that the cable 17 is located between the protrusions 32, 33 but is prevented by the ball 31 from running out through the gap between the protrusions 32, 33. The cable 17, therefore, is entrained around the profiled surface 16 of the wheel 12 as the wheel rotates.

The axis 13 may comprise a tube and the cable 17 may be guided through the tube. Such an arrangement provides for separation of the cable 17 from the wheel 12 at a location of reduced angular speed. There may also be provided means (not shown) separate from the wheel 12, for rotating on the axis 13 and adapted to rotate at the same speed as the wheel 12 for drawing the cable 17 in a direction normal to the plane of the wheel 12. The arrangement would be such that, when the cable 17 has been drawn off the profiled surface 16 of the wheel 12 and onto the said means, the said means can be slowed and stopped independently of the wheel 12 and the cable 17 can be returned to a starting position.

The wheel 12, being separate from the said means, is reaccelerated immediately after launch of the aircraft 21 so as to restore lost energy while the cable 17 is returned to the starting position.

It will be appreciated that, while the invention is particularly adapted for launching aircraft, it may also be suitable for other applications, such as for launching targets in a firing range.

The invention may also be suitable for other industrial applications, for example for propelling motor vehicles in crash testing.

It will be appreciated that an acceleration system in accordance with the present invention is simpler and more economic than high-pressure steam operated systems known hitherto.

What is claimed is:

1. An acceleration system comprising a cable (17), an end portion of which is adapted for releasably coupling with a load (11), a rotary member (12) adapted for rotation on an axis (13) and drive means (15) for disengageably engaging with the rotary member (12) so as to rotate the rotary member (12) on the axis (13), and the rotary member (12) is provided with a surface (16) for receiving a portion of the cable (17) remote from the load (11), and the surface (16) has a curved profile, the radial dimension of which increases progressively from the said axis (13) in an arcuate direction of the said axis (13), characterised in that there is provided means for engaging a portion of the said cable (17) remote from the load (11) with the said rotary member (12), while the said rotary member (12) is rotating, so that the portion of the said cable (17) remote from the load (11) locates on the said surface (16) while an end portion of the said cable (17) remote from the load (11) is restrained at a location on the rotary member (12) adjacent to a centre of the rotary member (12).

2. An acceleration system as claimed in claim 1 characterised in that the drive means (24) includes a clutch mechanism (29).

3. An acceleration system as claimed in claim 1 characterised in that the said engaging means includes a pair of spaced protrusions (32, 33) located at an end of the same cable (17) remote from the load (11).

4. An acceleration system comprising a cable (26), an end portion of which is adapted for releasably coupling with a load (21), a rotary member (22) adapted for rotation on an axis (23) and drive means (24) for disengageably engaging with the rotary member (22) so as to rotate the rotary member (22) on the axis (23), and an additional rotary member (25) adapted for rotation on a second axis, and an end portion of the said cable (26) remote from the load (21) is attached to the additional rotary member (25), and a second cable (27), an end portion of which is attached to the additional rotary member (25), and the rotary member (22) is provided with a surface (28) for receiving a portion of the said cable (27) remote from the additional rotary member (25), and the surface (28) has a curved profile, the radial dimension of which increases progressively from the said axis (23) in an arcuate direction of the said axis (23), characterised in that there is provided means for engaging a portion of the said cable (27) remote from the additional rotary member (25) with the said rotary member (22), while the said rotary member (22) is rotating, so that the portion of the said cable (27) remote from the additional rotary member (25) locates on the said surface (28) while an end portion of the said cable (27) remote from the additional rotary member (25) is restrained at a location on the rotary member (22) adjacent to a centre of the rotary member (22).

* * * * *